United States Patent [19]
Riera et al.

[11] Patent Number: 4,966,061
[45] Date of Patent: Oct. 30, 1990

[54] TUBE CUTTING APPARATUS

[76] Inventors: John F. Riera, 3689 Sandburg Dr., Troy, Mich. 48084; Billy J. Bielawski, Sr., 2270 Flanders Dr., Rochester Hills; John J. Pavelec, 413 Dalton, Rochester, both of Mich. 48063

[21] Appl. No.: 328,950
[22] Filed: Mar. 27, 1989
[51] Int. Cl.$^5$ ............................................. B26D 11/00
[52] U.S. Cl. ........................................ 83/862; 83/54; 83/310; 83/319; 83/454
[58] Field of Search ................... 83/319, 54, 310, 320, 83/862, 434; 269/268, 188

[56] References Cited

U.S. PATENT DOCUMENTS

| | | | |
|---|---|---|---|
| 3,273,433 | 9/1966 | Borzym | 83/54 |
| 3,288,011 | 11/1966 | Borzym | 83/310 |
| 3,288,012 | 11/1966 | Borzym | 83/310 |
| 4,109,555 | 8/1978 | Borzym | 83/319 |
| 4,563,927 | 1/1986 | Kinsley | 83/319 |
| 4,646,601 | 4/1987 | Borzym | 83/385 |
| 4,653,368 | 3/1987 | Riera et al. | 83/319 |
| 4,694,718 | 9/1987 | Kinsley | 83/319 |
| 4,766,792 | 8/1988 | Borzym et al. | 83/319 |

*Primary Examiner*—Frank T. Yost
*Assistant Examiner*—Hwei-Siu Payer
*Attorney, Agent, or Firm*—Harness, Dickey & Pierce

[57] ABSTRACT

A tube cutting apparatus includes a die jaw mounting arrangement whereby separate of opposed pairs of complemental die jaws are removably mounted onto respective jaw holders by slidable keeper plates and by headed fasteners, threadably connected to a holder. The keeper is slidably connectable to its fastener by a keyhole therein with portions of the keyhole being smaller and larger than the head and a bore through the jaw such that the keeper and jaw are retained on the holder when the fastener head is adjacent the smaller portion of the keyhole and released from the holder when the head is adjacent the larger keyhole portion. A notching blade positioning arrangement allows a gauging block to be inserted between horizontally spaced reference surfaces of a tube notching blade and a die jaw whereby the horizontal cutting path of the notching blade is accurately set. A severing blade mounting arrangement allows a tube severing blade to be rapidly installed/removed. A headed fastener allows a clamping plate to back off from clamping relation with the severing blade whereby the blade may be moved outwardly from vertically supported engagement with a support pin and guided vertically downward by the fastener body.

21 Claims, 3 Drawing Sheets

TUBE CUTTING APPARATUS

BACKGROUND AND SUMMARY OF THE INVENTION

The present invention relates to tube cutting apparatus for use in a continuous tube manufacturing die set and, more particularly, to tube cutting apparatus of the double cut type including a tube notching blade and a tube severing blade. The apparatus includes quick change features for accommodating replacement and/or installation of the tube severing blade and the tube engaging die jaws and an arrangement for ensuring the proper positioning of the horizontal notching surface of the notching blade relative to the die jaws.

In tube cutting apparatus of the double cut type, as the term is commonly referred to in the art, tubing is continuously passed through a tube cutoff die set wherein a notching cut in the tubing wall is followed by a vertical tube severing cut. Exemplary of such apparatus are Riera et al. "Tube Cutoff Die Set" U.S. Pat. No. 4,653,368 and "Replaceable Die Sets" U.S. patent application Ser. No. 222,947, filed July 22, 1988, the disclosure of each being specifically incorporated herein by reference.

Generally, the tube cutting apparatus includes means for moving tubing along a generally horizontal feed path, means for performing a notching cut by a notching blade mounted for reciprocal movement horizontally across the tube path, an axially elongated cutoff blade mounted for vertical severing movement following the notching cut, and tube holding means for releasably clamping the tube on both sides of the severing plane. Because continuous operation of the machine is important, downtime lost to changing tube clamping die jaws to accommodate different tube diameters should be held to a minimum. Further, downtime due to breakage of the tube severing blade or the need to change the blade to utilize a different cutting edge should also be held to a minimum for the same reason.

Accordingly, an object of the present invention is provision of a quick change arrangement whereby the tube severing blade and tube engaging jaw holders may be rapidly changed to effect different tube diameters.

Further, in a preferred form, the notching and tube severing blades both pass through a vertical passage defined between complemental pairs of die jaws. When the severing blade is in its upward vertical position the notching blade is in its rest position but hidden from view in the vertical passage between adjacent die jaws. To avoid dimples in the severed tube, the depth of the notching cut is of extreme importance. However, the exact location of the notching surface and thus the horizontal path of the notching blade is not truly known until the ram assembly has moved downwardly.

Accordingly, another object of this invention is provision of a quick and accurate arrangement and method for checking and adjusting, when needed, the position of the notching blade path relative to the die jaws.

When severing larger diameter tubes, the passage width may need to be changed as well as the notching and severing blades. To increase the width of the passage the user will oftentimes stuff a shim downwardly between the jaw and jaw holder. Use of shims can place bending moments on the jaws leading to their possible destruction. Further, these shims have typically not been precision parts but have comprised paper-thin metal sheets. In the past, blade holding blocks have been found to wear adversely and then require the user to replace an expensive machine part.

Accordingly another object of this invention is provision of an arrangement, useful in conjunction with the jaw holders and blade holder, which assures the user that the severing blade is properly disposed in its vertical severing plane.

In accordance with the present invention there is provided to each respective die jaw an arrangement which quickly allows the user to remove the die jaw from its jaw holder. Further, a clamping arrangement allows the tube severing blade to be rapidly installed and/or removed with its center axis aligned so as to not be angularly offset relative to a perpendicular vertically through the tube axis and lower die shoe. Exchanging the jaws or the severing blade is accomplished with a minimum of downtime and thus is relatively inexpensive.

To ensure the proper depth of the tube notch, the notching blade and the die jaws have gauging surfaces positioned relative to one another and preferably to the die shoe. In this regard, the notching blade has a first gauging surface vertically spaced by a preset amount from the notching surface and the top surface of the die jaw defines a second gauging surface spaced by a preset amount from the tube and the die shoe, the notching, gauging and die shoe surfaces being in a respective horizontal plane. Advantageously, maintaining the vertical spacing between the notching and gauging surfaces of the notching blade allows the user during sharpening of the notching blade to accurately set the horizontal plane of the notching surface for any given tube diameter and tube thickness.

In use, the user positions a precision gauging block on the gauging surface of the die jaw and then lowers the notching blade to bring its gauging surface against the block, thereby positioning the notching surface of the blade. In one aspect, a single replaceable cartridge carrying the die shoes could be removed from the press and gauging could be achieved by placing a reference gauge between the die shoe and either of the notching and gauging surfaces of the notching blade.

Other advantages and features will become apparent from the following specification taken in connection with the accompanying drawings.

DESCRIPTION OF THE PREFERRED EMBODIMENT

Figure 1:
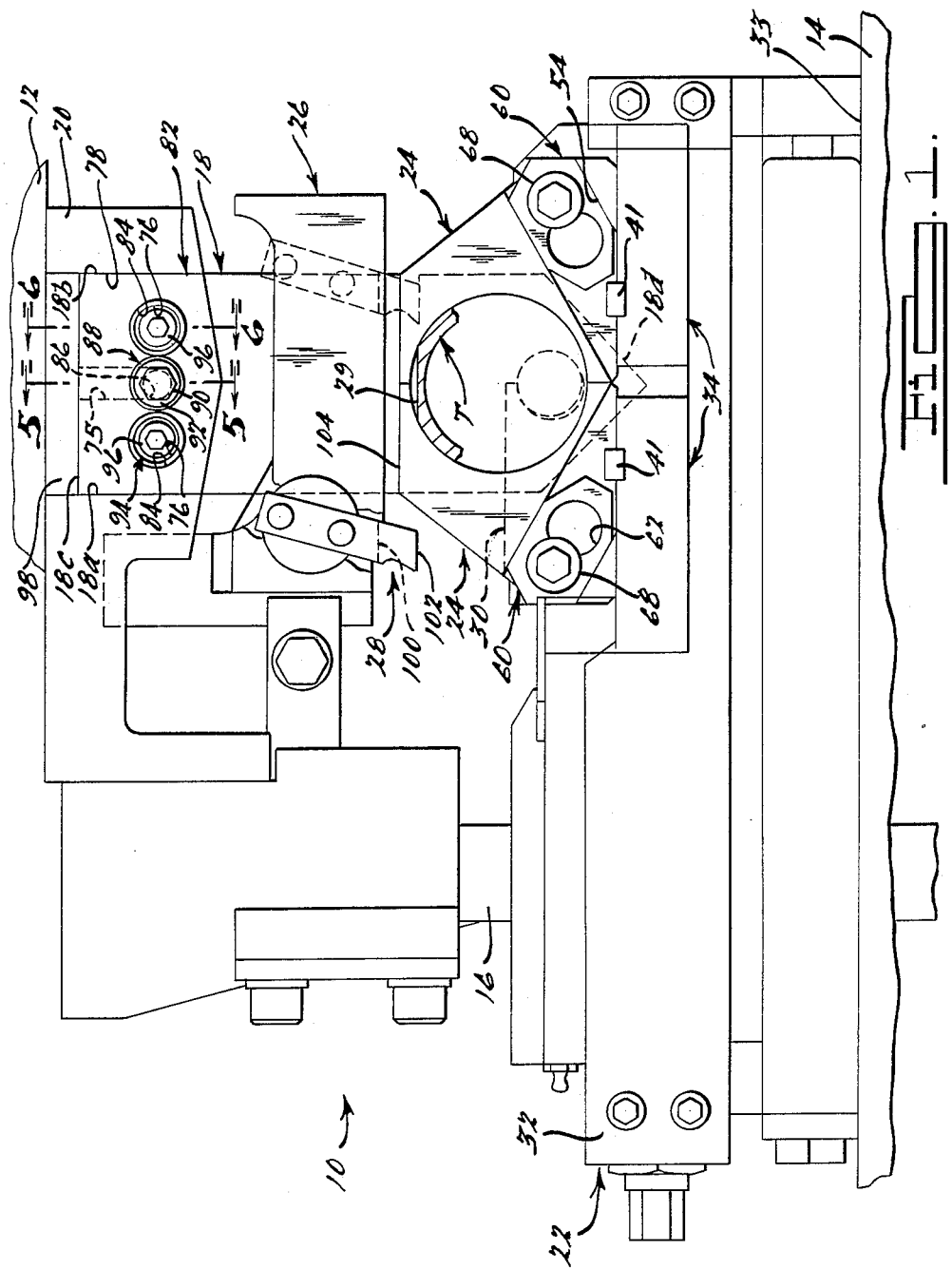
FIG. 1 is a side elevation view of a double cut tube cutting apparatus in accordance with the present invention.
Figure 2:
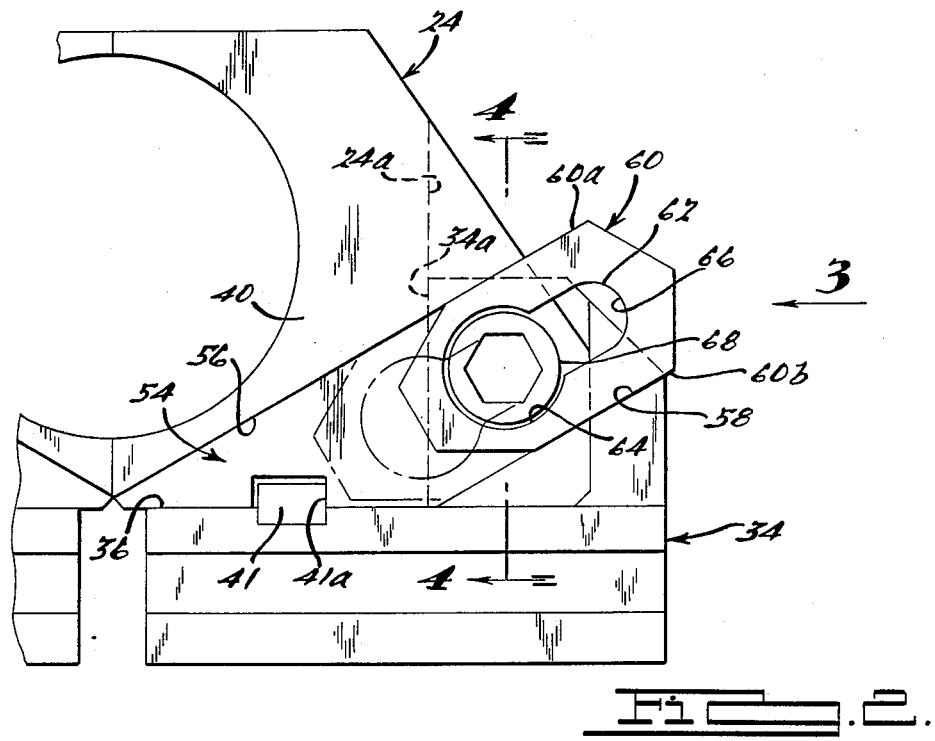
FIG. 2 is a view of a die jaw having a keeper in its retracted position.

Referring now to the drawings, in FIG. 1 there is shown a ram driven cutoff die set 10 of the double cut type wherein sections of tubing "T" are successively severed from a continuous length of tubing by a notching cut followed by a severing cut. While not shown, provision for moving the tubing along a generally horizontal feed path is provided. The apparatus will only be briefly described herein as to that detail necessary for an understanding of the improvements herein since the remainder of the structure is described in greater detail in the hereinabove Riera et al. documents.

Die set 10 includes an upper platen or die shoe 12 reciprocated vertically relative to vertical guide posts (not shown) towards a stationary lower platen or die shoe 14. The lower die shoe is positioned below the tube path and the upper die shoe reciprocates vertically between an upper raised rest position and a lowered cutting position. While not shown, a ram assembly is operably connected to the upper die shoe for reciprocating the die shoe and a cam driver 16 vertically. The entire die set can be mounted for horizontal movement, as a unit, as where it is associated with a tube mill continuously producing tubing, so that the shoes must move with the tubing during the cutoff operation. In such a situation, the lower die shoe is referred to as being stationary in that it may move horizontally with the upper die shoe but does not move vertically.

Die set 10 further includes a cutoff blade 18 mounted by a blade holder 20 on the upper die shoe for vertical movement therewith in a vertical tube severing plane when operated by the ram assembly, a cartridge 22 removably mounted on the lower die shoe and having die jaws 24 thereon for releasably clamping the tube on both sides of the severing plane in response to the cam driver, a cross-slide 26 mounted on the guide posts for reciprocal horizontal movement, and a notching blade 28 mounted on the cross-slide and operative to make a notching cut in the upper periphery of the tubing in response to the reciprocal movement of the cross-slide. The notching blade 28 is moved in a horizontal plane from one side of the tube feed path to the other side of the tube feed path to notch the outer periphery of the tube, whereupon downward movement of the upper die shoe drives the cutoff blade 18 through the tubing and severing same.

In Figure 1 notching blade 28 is shown in phantom at its rest position to the right of the tube and on the left side of the tube following its notching cut. The tube "T" is shown in section with a portion of the tube having been notched at 29. Die jaws 24 are for clamping engagement about large diameter tube whereas the die jaw 30, shown in phantom, illustrates the position of a smaller jaw for cutting a smaller diameter tube. While not shown, an arrangement is provided whereby the vertical position of notching blade 28 can be lowered, thereby moving the horizontal notching plane vertically downward, such as for use with jaw 30. Details of the structure for moving the notching blade horizontally or vertically are found in the above Riera et al. patent application.

The cartridge 22 is mounted onto surface 33 of die shoe 14 and includes a saddle or base 32, a pair of jaw holders 34 each slidably mounted on the saddle, and opposed pairs of complemental die jaws 24 for clamping the workpiece therebetween. The jaw holders are mounted to saddle 32 for sliding movement toward and away from each other and between an open, tube releasing position and a closed, tube clamping position. It is to be understood that, if desired, the die jaws and jaw holders could be mounted other than on a separate cartridge. The jaw holders have a top horizontal surface 36 for supporting the die jaws when mounted thereon and a pair of vertical surfaces 38 for positioning the respective die jaws.

In accordance with this invention, respective die jaws 24 are independently releasably secured to respective of the jaw holders 34. In the description which follows, it is to be understood that each die jaw 24 is separately installed and removed by like elements and each die jaw has a circular bore 44 extending between opposite vertical faces 40 and 42. When a pair of die jaws are mounted to a respective jaw holder, vertical faces 42 of each are opposed, interiorly facing, and spaced apart a preselected distance to define the vertical passageway through which both the severing blade 18 and notching blade 28 may pass.

When desired, a precision spacer plate 46 may be sandwiched between the jaw and jaw holder. A fastener 48 having a countersunk fastener head 50 and threaded body 52 threadably secures the plate 46 to the jaw holder 34, head 50 engaging the plate and body 52 passing through a bore 46a provided in the plate to threadably engage a threaded bore 34b of the jaw holder. The spacer plate 46 permits the user to change the position of the vertical severing plane, center the blade, and use blades of different thickness. Plate 46 is precisely ground to achieve a shimless positioning of confronting vertical faces 42 of the jaws and the blade passage defined thereby.

It is important to prevent any horizontal or vertical movement of the jaw relative to the jaw holder. To inhibit horizontal movement a keyway is formed between the jaw and jaw holder into which a key 41 is fit. The jaw has a forwardly facing vertical wall 41a which abuts the key 41 to inhibit forward movement, and the jaw and jaw holder have vertical walls 24a and 34a, respectively, which are abutted to inhibit rearward movement. The distance between respective vertical planes including the surfaces 24a and 34a and the wall 41a of the keyway is a fixed dimension which allows different die jaws to be exchanged, such as jaws 24 and 30.

The die jaw 24 includes a channel or groove 54 on its exteriorly facing vertical surface 40, the bore 44 opening into groove 54 and the groove having spaced parallel sidewalls 56 and 58 each being at an acute angle to the base of the jaw. A thin flat keeper plate 60 having a keyhole-shaped opening 62 is configured for slidable fitment within the groove with edges 60a and 60b of the plate engaging sidewalls 56 and 58. The keyhole is continuous and includes an enlarged circular portion 64 at one end and an elongated, narrow, slot-like portion 66 at its other end.

A headed fastener 68 having a threaded body 70 and an enlarged head 72 is threadably connected to a bore 74 in jaw holder 34. The head 72 in the embodiment shown is circular in cross-section and defined by a diameter which is dimensioned to be less than either the diameter of the bore 44 through the die jaw or the enlarged circular portion 64 of the keeper 60. The threaded body 70 is dimensioned to be less than the cross-section of the narrowed portion 66 of the keyhole 62 whereby threaded body 70 will constrain keeper plate 60 for sliding movement in the groove 54. When fastener head 72 is aligned with the circular portion 64, the keeper plate 60 and the jaw may be mounted and/or removed from the jaw holder. Slidable movement of the keeper plate along groove 54 brings the fastener head 68 into alignment with the narrowed portion 66 thereby inhibiting removal of keeper 60 relative to the head and the keeper 60 and the die jaw 24 relative to the jaw holder 34. When head fastener 72 is aligned with the narrowed portion, inward threadable advance of the fastener 68 causes the head 72 to move towards the keeper plate 60, causing the keeper plate to be driven towards and against vertical surface 40 of the die jaw and the die jaw to be driven towards and against the jaw holder and into tight clamping relation therewith.

Advantageously, narrowed portion 66 of keeper 60 functions to engage body 70 of the fastener 68 to prevent vertical movement of the die jaw relative to holder 34, even if the keeper should slide slightly vertically upwardly relative to its groove. Keeper 60 cooperates with walls 24a and 34a of the jaw and jaw holder, respectively, to prevent movement of the jaw. That is, bending moments on the jaw are inhibited by the walls 24a, 34a and by the threaded of fastener 68 relative to its connection to keeper 60.

Figure 3:
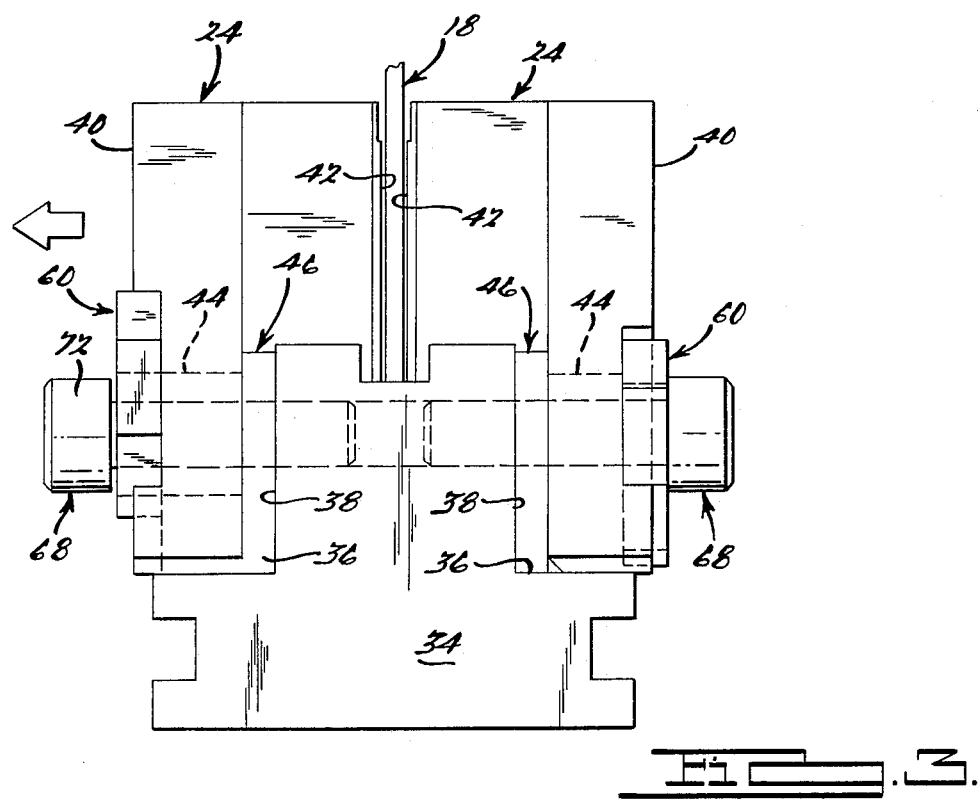
FIG. 3 is an end view of the apparatus shown in FIG. 2.
Figure 4:
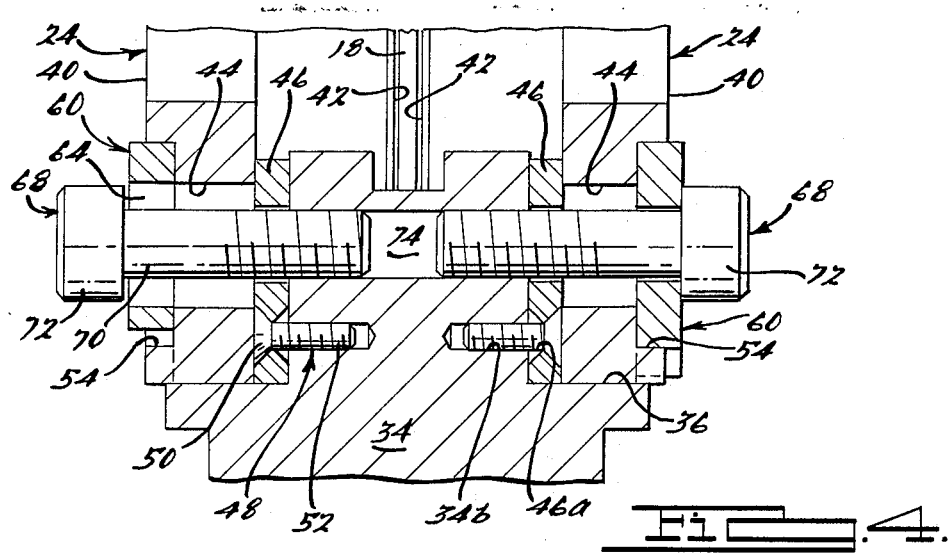
FIG. 4 is a section view taken along line 4—4 of FIG. 2 portion of the die jaw securement.
Figures 5, 6:
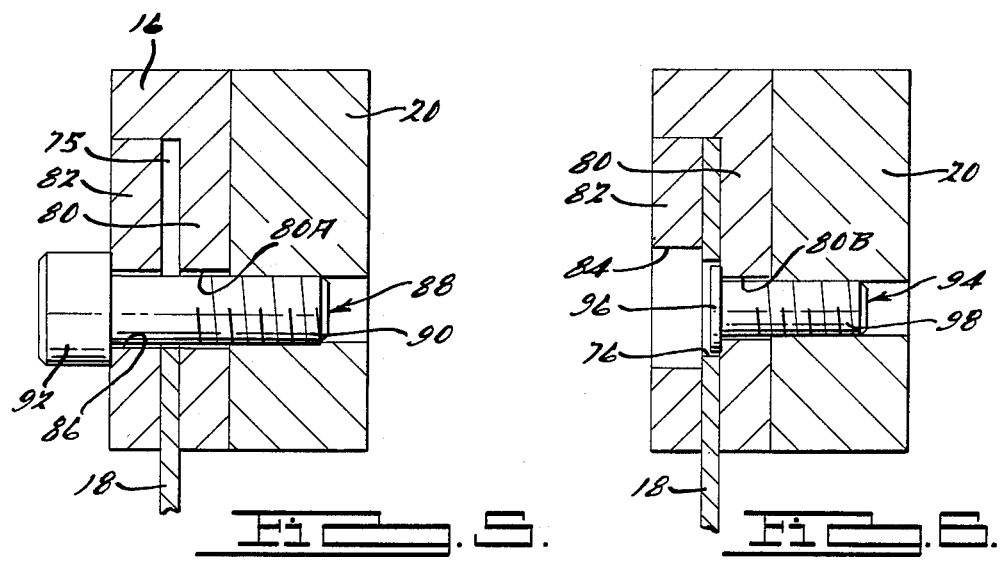
FIGS. 5 and 6 taken, respectively, along lines 5—5 and 6—6 of FIG. 1 showing detail of the vertical tube cutting blade.
Figures 7, 8:
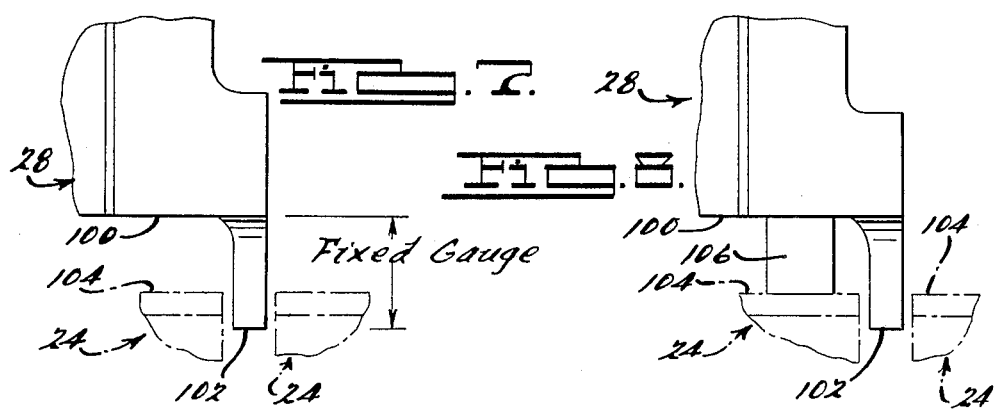
FIGS. 7 and 8 show detail of the horizontal notching blade and its use with the die jaws for setting notching blade position.

Referring to FIG. 4, keeper plates 60 are shown to the right and left of the cut-off blade 18. The keeper plate to the right is shown clamping the die jaw against the die jaw holder. The keeper plate to the left is shown with the keeper and die jaw in the release position. In this position, the fastener 68 is partially unthreaded to back off from the jaw holder 34 whereby the head 72 thereof is spaced outwardly from the plate and the plate is moved in a sliding manner relative to groove 54 such that the enlarge portion 64 is aligned with the head 72. The die jaw and keeper may be removed in the direction of the arrow (see FIG. 3) by passing each over the head 72 of fastener 68.

Further, in accordance with this invention, there is provided an arrangement for releasably mounting the severing blade 18 to the blade holder 20 and thus to the ram assembly. Severing blade 18 is axially elongated, has generally parallel longitudinally extending edges 18a and 18b, and defines a mounting end portion and a severing end portion at its opposite ends 18c and 18d. The mounting end portion is particularly characterized by an axial slot 75 extending axially inward from the mounting end 18c and a pair of openings 76 one on each side of the slot 74. Blade holder 20 includes a recessed guideway 78 for receiving the mounting end portion of the severing blade, the guideway assuring that the blade is in its proper vertical severing plane and the opposite lateral vertical guidewalls of the guideway assuring that the severing end 18d of the blade axis is perpendicular to the lower die shoe. If desired, a spacer plate 80 is disposed in guideway 78 and sandwiched between the blade holder 20 and cut-off blade 18 whereby to change the position of the vertical severing plane.

A clamping plate 82 having three bores 84, and 86 therethrough is mounted to blade holder 20 and received in the guideway 78, the center bore 86 being aligned with the slot, 4 and the outer bores 84 being aligned with one respective opening 76. A headed fastener 88 has a threaded body 90 threadably connected to blade holder 20 and an enlarged head 92 the head being adapted to drive the clamping plate 82 inwardly towards and outwardly from the blade holder and between a first position, wherein the clamping plate and cut-of blade are spaced from the blade holder and to a second position, wherein the blade 18 and plate 82 are driven inwardly against the blade holder. The threaded body 90 extends through the center bore 86 of the clamping plate 82, through a center bore 80A of spacer 80 (when provided), and slot 75 when blade 18 is disposed in the guideway 78.

In the embodiment shown, a pair of thin headed fasteners 94 pass through bores 80B in the spacer 80 (when provided) to threadably fasten into the blade holder 20, each fastener having a thin axial head 96 and a threaded body 98. Heads 96 of fasteners 94 are aligned with the outermost bores 84 in the clamping plate 82 and each has a socketed head to allow for threadable adjustment. Once installed, however, fasteners 94 are intended to remain fixed. The heads 96 of the fasteners 94 protrude axially outward from spacer 80, or the blade holder 20 if the spacer is not used, to be disposed entirely within the openings 76 of the severing blade, the heads being sized so as to not extend outwardly beyond the blade when the blade is abutted against the blade holder (or spacer 80, if used). The thin heads 96 of fasteners 94 are utilized as shoulders to support the blade from downward vertical movement.

It is to be understood that a threaded fastener could extend from the other side of holder 20 such that its end protrudes outwardly of the holder 20 (or spacer 80, if provided). In this regard, the threaded end portion of such a fastener would threadably secure the spacer 80 to the holder and protrude outwardly therefrom to define the blade support shoulder.

Advantageously, spacer 80 cooperates with spacers 46 to enhance achievement of a shimless blade severing plane. Further, spacer 80 functions as a plate against which blade 18 can wear. When adverse wear results, plate 80 can be replaced by removal of two fasteners.

In operation, assuming spacer 80 is disposed in guideway 78, the headed fastener 88 is threadably adjusted such that the head 96 and clamping plate 82 are spaced from the spacer 80 a distance sufficient to pass the severing blade. The severing blade 18 is positioned below the clamping plate and moved upwardly in guideway 78, causing the slot 75 register with the threaded body 90 and guide the blade upwardly until the bottom of the slot engages the body 90 whereupon the mounting end 18c of the blade abuts a flange 91 extending from the spacer 80. The blade is urged inwardly towards the spacer whereupon the blade openings 76 seat about the heads 96 of thin headed fasteners 94. Threadable advance of the fastener 88 causes the head 92 to drive the clamping plate 82 inwardly into tight clamping engagement with the blade. For release, the above steps are reversed.

Further in accordance with this invention, an arrangement is provided whereby the cutting surface 102 of the notching blade 28 may be precisely adjusted. As seen in phantom in FIG. 1, when the ram assembly is in its upwardmost position the notching blade is to the right of the tube feed path and has its cutting surface partially hidden by the die jaws 24. Downward movement of the ram assembly causes the notching blade to move towards the left (as viewed in FIG. 1). Accurate adjustment of the horizontal notching surface plane is achieved by providing three parallel vertically spaced horizontal reference surfaces 100, 102 and 104 which are used in connection with gauging blocks 106

The notching blade is provided with a horizontal reference surface 100 vertically rearward of cutting surface 102, each surface 100 and 102 being in a horizontal plane and the vertical separation between each being accurately preset. The top surface 104 of the die jaw represents second reference surface which is a predetermined distance from the top of the tube. A gauging block 106, having a preset cross-section and preset for use with a particular tube diameter and thickness, is placed on the top reference surface 104 of the die jaw 24 whereupon the cross-slide of the notching blade is adjusted so that the notching blade 28 moves vertically downward and the reference surface 100 of the notching blade brought into seating engagement with the top surface of the block 106. This sets the cutting surface 102 and 28, is properly. Advantageously, when the notching blade gets chipped and/or dull and the user has to sharpen the blade, the user grinds both the notching surface 102 and the reference surface 102 such that the same amount of material is removed from each. That is, by maintaining a constant vertical separation between the notching blade surfaces 100 and 102, the gauge block 106 allows the notching surface 100 to be accurately set relative to the surface 104 of the die jaws 24.

Alternatively, if cartridge 22 is removed from the press, a precision gauging block may be positioned between the top surface of lower die shoe 14 and one of the gauging surfaces of notching blade 28. This also will achieve a desired setting of the horizontal notching surface.

While the above description constitutes the preferred embodiment of the invention, it will be appreciated that the invention is susceptible to modification, variation, and change without departing from the proper scope or fair meaning of the accompanying claims.

What I claim is:

1. In an apparatus for severing a tubular workpiece and of the type including a base, a ram assembly vertically reciprocable relative to the base, a severing blade operated by said ram assembly to sever said workpiece, a pair of opposed complemental die jaws for clamping said workpiece therebetween, a pair of jaw holders for respectively mounting said die jaws on said base, and securing means for releasably securing said die jaws to jaw holders, the improvement being characterized in that the securing means operate independently of one another to secure each respective die jaw to its corresponding jaw holder, said jaw having a bore therethrough, a headed fastener having a body threadably connected to the jaw holder, and a keeper removably connectable to said fastener such that the jaw is sandwiched between said keeper and holder, said keeper being connected to the fastener for relative transverse movement thereto between jaw and keeper releasing and retaining positions, whereby when the keeper is in its retaining position inward threadable adjustment of the fastener causes the head to move inwardly and thus drive the keeper and jaw into firm clamped engagement with the holder, contrariwise when the head moves outwardly and the keeper is free to move to its releasing position.

2. The apparatus as recited in claim 1 wherein said keeper has a keyhole shaped opening defining narrowed and enlarged portions which are, respectively, smaller than and greater than the dimension of the head and which define, respectively, the retaining and releasing positions when adjacent the head.

3. The invention as recited in claim 2 wherein the bore and said enlarged portion are generally circular and the narrowed portion defines an elongated slot.

4. The invention as recited in claim 1 wherein said keeper comprises an elongated rectangular plate and said die jaw includes a recessed groove, the keeper being received in the groove and constrained for slidable movement relative to said die jaw.

5. The invention as recited in claim 1 wherein each of said die has opposed vertical faces which are spaced apart a preselected distance to define a vertical passageway through which the severing blade may pass, and the jaw holder has a vertical mounting surface from which the fastener body extends, further comprising adjustment means, associated with said die jaw securing means, for changing said preselected distance, said adjustment means comprising a spacer plate being mounted to the mounting surface to space the die jaw laterally therefrom.

6. The invention as recited in claim 2 wherein said keeper and die jaw are abutted such that said bore and said keyhole define a continuous passageway, said headed fastener comprises an axially elongated, partially threaded, body disposed in said continuous passageway and an enlarged head which is adapted to be disposed entirely exterior of the continuous passageway to engage the keeper, said head having a dimension greater than the narrowed portion of said keyhole to inhibit the keeper and die jaw from moving away from the jaw holder but smaller than the enlarged portion of said keyhole to permit the keeper and die jaw to pass freely over the head and away from the jaw holder.

7. The invention as recited in claim 6 wherein the head, the bore, and the enlarged portion of said keyhole are circular.

8. The invention as recited in claim 1 wherein said severing blade comprises an axially extending thin flat plate the opposite vertical ends of which define workpiece severing and blade mounting end portions, and further including mounting means for releasably mounting the severing blade to said ram assembly, said mounting means being characterized by said mounting end portions having a slot extending axially inward from the mounting end and an opening therethrough, a clamping plate mounted to the ram for movement between a first position, spaced from the blade and the ram, and to a second position, engaging and driving the blade against the ram, and releasable locking means for allowing the blade to be released when the clamping plate is in the first position and locking the blade when the clamping plate is in the second position.

9. The invention as recited in claim 8, wherein said locking means includes a support pin received in the opening for supporting the blade and operative only in the first position and a guide pin received in the slot and operative in the second position.

10. The invention as recited in claim 9, wherein the support pin extends outwardly from the ram and has a dimension not exceeding the thickness of the severing blade.

11. The invention as recited in claim 9 wherein said guide pin comprises a threaded fastener having a head engaging the clamping plate and a partially threaded body extending through the clamping plate and the slot for threaded securement into the ram, and said support pin has a thickness less than the thickness of said severing blade, threadable adjustment of the threaded fastener moving the head toward or away from the ram with movement away from the severing blade a distance greater than the thickness of the support pin allowing the blade to move outwardly beyond the support pin whereby the blade may drop vertically relative to the slot.

12. The invention as recited in claim 11 including alignment means for aligning the severing blade such that its longitudinal axis is primarily perpendicular to the base, said alignment means comprising said ram including a vertically disposed recessed guideway which receives the blade and having lateral sidewalls which adjoin the lateral edges of the blade.

13. The invention as recited in claim 11 including spacer means associated with the blade and the ram for laterally adjusting the vertical severing plane of the severing blade relative to the die jaws.

14. The invention as recited in claim 13, the spacer means including a spacer sandwiched between the blade and ram and secured to the ram by the support pin.

15. The invention as recited in claim 1 wherein said severing blade comprises an axially extending thin flat plate, and further including mounting means for releasably mounting the severing blade to the ram assembly, said mounting means comprising said severing blade having an opening therethrough and a slot therein, a blade clamping plate, driving means operatively extending into the slot for driving the clamping plate and blade against the ram, and a thin headed member extending from the ram into said opening to support and prevent said blade from falling vertically when the blade is against the ram, said driving means guiding the blade for vertical movement and positioning said clamping plate a sufficient distance from said ram to allow the blade to clear said thin headed member whereby the slot allows the blade to fall vertically axially.

16. The invention as recited in claim 1 wherein said severing blade comprises an axially extending thin plate, and further including mounting means for releasably mounting the blade to said ram assembly, the mounting means being characterized by one end portion of said blade having a slot extending axially inward from the end thereof and an opening therethrough, a pair of protuberances extending from said ram with one and the other protuberance being disposed, respectively, in said slot and opening, said one protuberance having a dimension that is less than the thickness of said blade, and clamping means for clamping the plate, said clamping means being movable towards the ram and away from the ram by a distance greater than the dimension of said one protuberance whereby when said blade is moved said distance said blade may be moved vertically relative to said slot.

17. The invention as recited in claim 1 further including a notching blade mounted on said ram assembly and having a notching surface operative to make a notching cut in the upper periphery of the workpiece in response to the reciprocable movement of said ram, and means for permitting vertical adjustment of the notching surface of said notching blade relative to the workpiece, the improvement characterized by said die jaw having a horizontal surface accurately positioned vertically relative to the base, said notching surface is generally horizontally disposed, and further including positioning means for accurately positioning the notching surface to properly notch the workpiece, said positioning means comprising said notching blade including a reference surface disposed at a fixed vertical distance to said notching surface and horizontal thereto whereby insertion of a gauging block between the horizontal surface of the die jaw and the reference surface of the notching blade positions the notching surface relative to the jaw holders.

18. Apparatus for clamping a workpiece, comprising a pair of opposed, complemental die jaws for clamping said workpiece therebetween, first and second jaw holders respectively mounting said die jaws for sliding movement toward and away from each other between an open and a closed position, and releasable mounting means for releasably mounting at least one said die jaw, having a bore therethrough, to its respective jaw holder, said mounting means comprising a headed fastener having a shaft threadably connected to the holder and a keeper plate removably mountable on the holder and including a keyhole-shaped opening which connects with the fastener and constrains said keeper to sliding movement between jaw releasing and jaw retaining positions, the keyhole having an enlarged portion, sized to pass the head and defining the jaw releasing position and a narrowed portion, sized to prevent the head from passing and defining the jaw retaining position, and said head having a dimension which is smaller than either the enlarged portion or said bore to allow installation or release of both the keeper and the jaw but greater than the narrowed portion to prevent movement of the keeper away from the holder, whereby threading movement of said fastener causes the head when adjacent to the narrowed portion to engage the keeper and drive said keeper and die jaw inwardly against the jaw holder whereas unthreading movement of the fastener causes the head to move away from the jaw holder and its clamping engagement with the keeper.

19. Apparatus for use in tube cutting, comprising a jaw holder, a keeper plate having a keyhole shaped opening therethrough and defined by narrowed and enlarged portions, a tube engaging die jaw having a pair of vertical sidewalls through which a bore extends, one and the other sidewall, respectively, being adapted to engage said holder and said keeper, and an elongated headed shaft threadably connected to said holder for releasably retaining said die jaw and said keeper on said holder, said shaft being greater in length than the combined width of said keeper and said jaw and sized to pass through said keyhole portions and said bore, and said head being dimensioned, respectively, to be greater than that of said narrowed portion whereby to inhibit movement of the keeper and bore away from the jaw holder and less than that of either said bore or said enlarged portion whereby to permit movement of said jaw and keeper away from the holder, the shaft constraining the keeper to movement laterally of the shaft axis and threadable advance of the shaft head toward the holder clamping the keeper and jaw against the holder.

20. The invention as recited in claim 19 wherein said one sidewall includes a recessed groove sized to receive said keeper, one edge of said keeper being adjacent to the groove.

21. The invention as recited in claim 20 wherein said die jaw has a base, and said groove is at an acute angle to the base of said jaw when the die jaw is mounted to said holder.

* * * * *